US012609312B2

(12) United States Patent
Oh et al.

(10) Patent No.: US 12,609,312 B2
(45) Date of Patent: Apr. 21, 2026

(54) POSITIVE ELECTRODE AND LITHIUM SECONDARY BATTERY INCLUDING THE SAME

(71) Applicant: LG Energy Solution, Ltd., Seoul (KR)

(72) Inventors: Seok Jin Oh, Daejeon (KR); Hee Chang Youn, Daejeon (KR); Joo Hwan Sung, Daejeon (KR); Jin Young Park, Daejeon (KR); Min Wook Lee, Daejeon (KR); Jong Seon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/750,222

(22) Filed: Jun. 21, 2024

(65) Prior Publication Data

US 2024/0429382 A1 Dec. 26, 2024

(30) Foreign Application Priority Data

Jun. 22, 2023 (KR) ........................ 10-2023-0080685
Apr. 3, 2024 (KR) ........................ 10-2024-0045608

(51) Int. Cl.
    *H01M 4/525*     (2010.01)
    *H01M 4/02*     (2006.01)
    (Continued)

(52) U.S. Cl.
    CPC ......... *H01M 4/525* (2013.01); *H01M 10/052* (2013.01); *H01M 10/4235* (2013.01); *H01M 2004/021* (2013.01); *H01M 2004/028* (2013.01)

(58) Field of Classification Search
    CPC ............... H01M 4/525; H01M 10/052; H01M 10/4235; H01M 2004/021; H01M 2004/028
    (Continued)

(56) References Cited

U.S. PATENT DOCUMENTS

2007/0065725 A1* 3/2007 Inoue .................... H01M 4/134
                                      429/232
2016/0268608 A1 9/2016 Nishimura et al.
           (Continued)

FOREIGN PATENT DOCUMENTS

CN         115472786 A    12/2022
EP          3742533 A1    11/2020
         (Continued)

OTHER PUBLICATIONS

English language machine translation of "Battery" by Igawa Michiko in JPH1116566 (A)—(Year: 1999).*
        (Continued)

*Primary Examiner* — Niki Bakhtiari
*Assistant Examiner* — Omar M Kekia
(74) *Attorney, Agent, or Firm* — Lerner David LLP

(57) ABSTRACT

The present disclosure relates to a positive electrode including a positive electrode active material, a positive electrode conductive material, and a positive electrode binder, wherein the positive electrode active material includes a lithium nickel-based oxide containing 70 mol % or less of nickel among all metals excluding lithium, wherein the lithium nickel-based oxide includes single particle-type particles, and the conductive material includes a linear conductive material and a dotted conductive material, and $F_{CR}$ defined by Equation (1) below satisfies 12 to 20:

$$F_{CR} = d_{c1} \times d_{c2} \times D_{50.a} \qquad \text{[Equation (1)]}$$

wherein, $d_{c1}$ is the true density (unit: g/cm$^3$) of the linear conductive material above, $d_{c2}$ is the true density (unit: g/cm$^3$) of the dotted conductive material above, and $D_{50.a}$ is the average particle diameter of the positive electrode active material (unit: μm).

21 Claims, 2 Drawing Sheets

(51) Int. Cl.
  *H01M 10/052*     (2010.01)
  *H01M 10/42*      (2006.01)
(58) Field of Classification Search
  USPC ........................................................ 429/209
  See application file for complete search history.

(56)            References Cited

U.S. PATENT DOCUMENTS

| | | | |
|---|---|---|---|
| 2017/0149087 A1* | 5/2017 | Maruo | .............. H01M 10/0567 |
| 2018/0175439 A1 | 6/2018 | Kang et al. | |
| 2019/0044150 A1* | 2/2019 | Kim | ...................... H01M 4/139 |
| 2021/0005875 A1 | 1/2021 | Lee et al. | |
| 2021/0119206 A1 | 4/2021 | Nagai et al. | |
| 2022/0181615 A1 | 6/2022 | Lee et al. | |
| 2022/0223840 A1 | 7/2022 | Kobayashi | |
| 2022/0285690 A1 | 9/2022 | Lee et al. | |
| 2022/0352514 A1 | 11/2022 | Yoshikawa et al. | |
| 2022/0407052 A1 | 12/2022 | Lee et al. | |
| 2023/0084563 A1 | 3/2023 | Bizet et al. | |
| 2023/0086038 A1 | 3/2023 | Heo et al. | |
| 2023/0137520 A1 | 5/2023 | Kim et al. | |
| 2024/0387818 A1 | 11/2024 | Cho et al. | |

FOREIGN PATENT DOCUMENTS

| | | | | |
|---|---|---|---|---|
| JP | H1116566 A | * | 1/1999 | ............. Y02E 60/10 |
| JP | 2016009543 A | | 1/2016 | |
| JP | 2016111013 A | | 6/2016 | |
| JP | 2016131123 A | | 7/2016 | |
| JP | 6898731 B2 | | 7/2021 | |
| JP | 2022-055888 A | | 4/2022 | |
| JP | 2022-066883 A | | 5/2022 | |
| JP | 2023512026 A | | 3/2023 | |
| KR | 2017-0031061 A | | 3/2017 | |
| KR | 2020-0107843 A | | 9/2020 | |
| KR | 20220126004 A | | 9/2022 | |
| KR | 2022-0167037 A | | 12/2022 | |
| KR | 20230038122 A | | 3/2023 | |
| KR | 20230038124 A | | 3/2023 | |
| KR | 20230051104 A | | 4/2023 | |
| KR | 20230053534 A | | 4/2023 | |
| WO | 2019216275 A1 | | 11/2019 | |
| WO | 2022005242 A1 | | 1/2022 | |
| WO | 2023-059152 A1 | | 4/2023 | |

OTHER PUBLICATIONS

Aljaafari A. A. et al: "Carbon nanotube, single-walled = 95 carbon 99 as carbon nanotubes, average diameter 0.84nm 308068-56-6", , Apr. 4, 2011 (Apr. 4, 2011), pp. 394-399, XP093218298, Retrieved from the Internet: URL: https://www.sigmaaldrich.com/DE/en/product/aldrich/775533?srsltid=AfmBOopigkCQNOovAH4cnzMk8E4Nu9frgblVui1YxST6o4HwXwf95 1U3.

Anonymous: "Gestis Substance Database", , Jan. 2, 2000 (Jan. 2, 2000), XP093218265, Ispra, Italy Retrieved from the Internet: URL:https://batavia.internal.epo.org/citenpl/citation/prod/pdf/70c87278-1 d44-30ab-b4c1 -99e1 fa499d5e.pdf.

Anonymous: "Single Walled Carbon Nanotubes, purity92%, OD 1-2 nm", , Dec. 1, 2023 (Dec. 1, 2023 ), XP093218294, Retrieved from the Internet: URL:https://web.archive.org/web/20231201201851/https://nanografi.com/carbon-nanotubes/single-walled-carbon-nanotubes-purity-92-od-1-2-nm/.

Extended European Search Report for Application No. 24183573.5 dated Nov. 7, 2024. 5 pgs.

* cited by examiner

[FIG. 1]
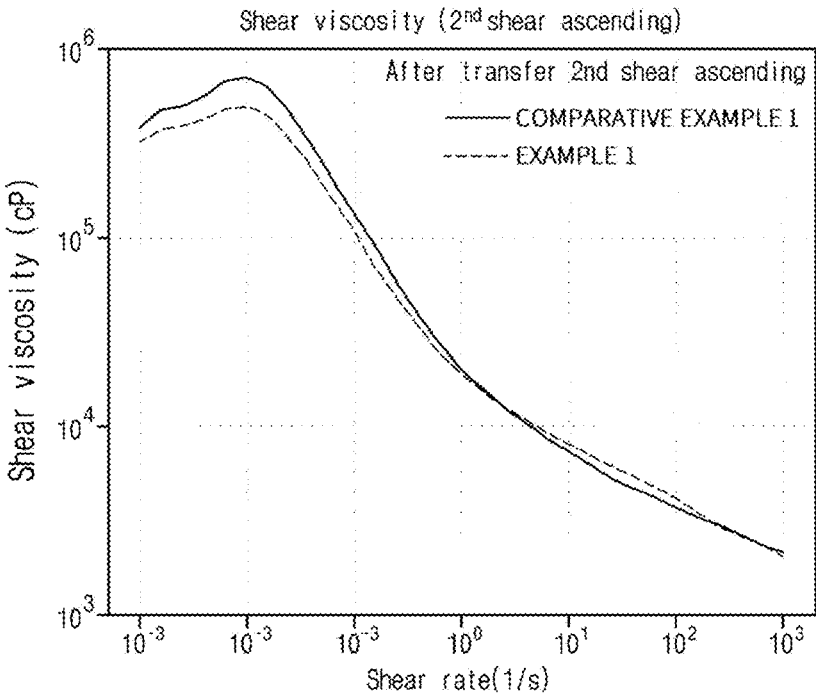
[FIG. 2]
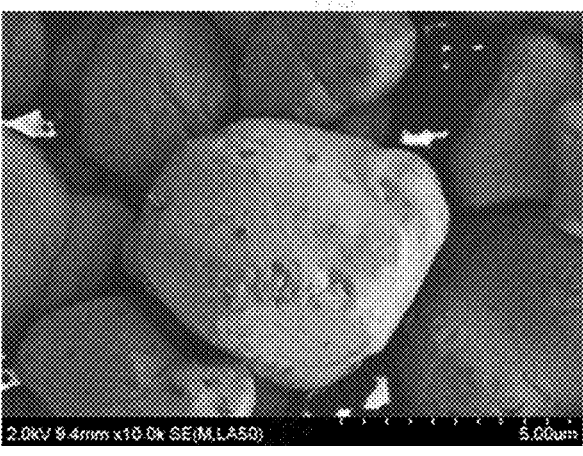

[FIG. 3]
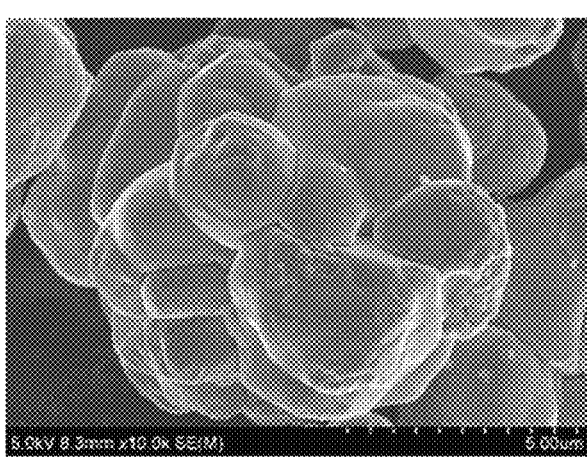
[FIG. 4]
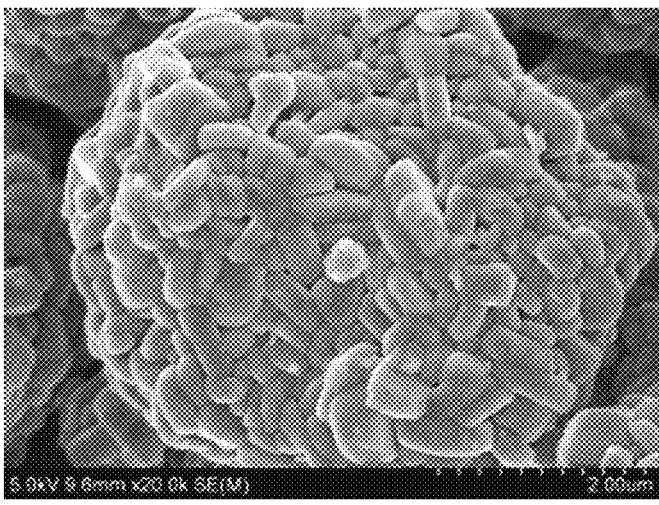

POSITIVE ELECTRODE AND LITHIUM SECONDARY BATTERY INCLUDING THE SAME

CROSS-REFERENCE TO RELATED APPLICATIONS

This disclosure claims the priority of Korean Patent Application Nos. 10-2023-0080685 filed on Jun. 22, 2023 and 10-2024-0045608 filed on Apr. 3, 2024, in the Korean Intellectual Property Office, the disclosure of which is incorporated herein by reference.

BACKGROUND

Technical Field

The present disclosure relates to a positive electrode and a lithium secondary battery including the same, and more particularly, to a positive electrode and a lithium secondary battery including the same, which are capable of implementing high energy density and also minimizing degradation in cell performance due to the agglomeration of a conductive material.

Background

With the development of technologies such as electric vehicles, energy storage systems (ESS), and portable electronic devices, the demand for lithium secondary batteries as an energy source is rapidly increasing.

Meanwhile, in the field of electric vehicles, cells with high energy density are required to increase mileage per trip, and accordingly, research has been conducted to increase the content of a positive electrode active material in a positive electrode active material layer. In order to increase the content of a positive electrode active material, the content of components other than the positive electrode active material, that is, the content of a conductive material and/or a binder should be reduced. Therefore, in recent years, a method for reducing the content of a conductive material in a positive electrode has been pursued by applying, as a positive electrode conductive material, a linear conductive material having a relatively large specific surface area instead of a dotted conductive material which has been typically used. However, since a linear conductive material has high cohesiveness, if the linear conductive material is applied, agglomeration of the conductive material occurs, which puts a lot of load on a mixer during a positive electrode slurry mixing process, increases the mixing time thereby being energy consuming, and increases the overall viscosity of the positive electrode slurry, thereby reducing coating properties, so that there is a problem in that the solid content of the positive electrode slurry must be maintained at a low level to facilitate coating. In addition, due to the agglomeration of the linear conductive material, the distribution of the conductive material in a positive electrode active material layer becomes uneven, so that cell resistance increases, local deterioration occurs, thereby causing lithium plating, and as a result, there may be problems in that cell capacity decreases, resistance increases, the amount of gas increases, and the like.

Therefore, there is a demand to develop a positive electrode and a lithium secondary battery including such a positive electrode having high energy density and minimized degradation in cell performance due to the agglomeration of a conductive material while reducing or maintaining the energy consumption necessary to produce it.

BRIEF SUMMARY

An aspect of the present disclosure provides a positive electrode and a lithium secondary battery including the same, which are stably driven at a high voltage, thereby implementing high energy density, and in which degradation in cell performance due to the agglomeration of a conductive material is minimized.

According to an aspect of the present disclosure, there is provided a positive electrode including a positive electrode active material, a positive electrode conductive material, and a positive electrode binder, wherein the positive electrode active material includes a lithium nickel-based oxide containing 70 mol % or less of nickel among all metals excluding lithium, wherein the lithium nickel-based oxide includes single particle-type particles, and the conductive material includes a linear conductive material c1 and a dotted conductive material c2, and $F_{CR}$ defined by Equation (1) below satisfies 12 to 20.

$$F_{CR} = d_{c1} \times d_{c2} \times D_{50.a} \qquad \text{[Equation 1]}$$

wherein, in Equation (1) above, $d_{c1}$ is the true density (unit: g/cm$^3$) of the linear conductive material c1, $d_{c2}$ is the true density (unit: g/cm$^3$) of the dotted conductive material c2, and $D_{50.a}$ is the average particle diameter ($D_{50}$) of the positive electrode active material (unit: μm).

The $D_{50.a}$ may be from 3 μm to 8 μm.

The $d_{c1}$ may be from 1.0 g/cm$^3$ to 5.0 g/cm$^3$.

The $d_{c2}$ may be from 0.5 g/cm$^3$ to 3.0 g/cm$^3$.

The positive electrode may also satisfy $F'_{CR}$ defined by Equation (2) below satisfies $1.0 \times 10^6$ to $2.5 \times 10^7$ $$F'_{CR} = BETc_1 \times dc_1 \times BETc_2 \times dc_2 \times (D_{50.a})^2 \qquad \text{Equation (2):}$$

wherein, in Equation (2) above, $BETc_1$ is the BET specific surface area (unit: m$^2$/g) of the linear conductive material c1, $BETc_2$ is the BET specific surface area (unit: m$^2$/g) of the dotted conductive material c2, $d_{c1}$, $d_{c2}$ and $D_{50.a}$ being as defined in relation with Equation (1).

According to another aspect of the present disclosure, there is provided a positive electrode including a positive electrode active material, a positive electrode conductive material, and a positive electrode binder, wherein the positive electrode active material includes a lithium nickel-based oxide containing 70 mol % or less of nickel among all metals excluding lithium, wherein the lithium nickel-based oxide includes single particle-type particles, and the conductive material includes a linear conductive material and a dotted conductive material, wherein the linear conductive material has a true density of 1.0 g/cm$^3$ to 5.0 g/cm$^3$, and the dotted conductive material has a true density of 0.5 g/cm$^3$ to 3.0 g/cm$^3$, and the positive electrode active material has an average particle diameter ($D_{50}$) of 3 μm to 8 μm.

According to another aspect, the present disclosure relates to a positive electrode slurry composition including a positive electrode active material, a positive electrode conductive material, a positive electrode binder, and a solvent, wherein the positive electrode active material includes a lithium nickel-based oxide containing 70 mol % or less of nickel among all metals excluding lithium, wherein the lithium nickel-based oxide includes single particle-type particles, and the positive electrode conductive material includes a linear conductive material and a dotted conductive material, wherein the linear conductive material has a true density of 1.0 g/cm³ to 5.0 g/cm³, and the dotted conductive material has a true density of 0.5 g/cm³ to 3.0 g/cm³, and the positive electrode active material has an average particle diameter ($D_{50}$) of 3 μm to 8 μm.

The positive electrode and the positive electrode slurry according to the present disclosure may comprise one or more of the following features in any technically feasible combinations.

The positive electrode conductive material may include the linear conductive material and the dotted conductive material at a weight ratio of 1:1 to 10:1, preferably 1:1 to 8:1, more preferably 1:1 to 7:1.

The BET specific surface area of the dotted conductive material may be greater than the BET specific surface area of the linear conductive material.

The dotted conductive material may have a BET specific surface area of 100 m²/g to 500 m²/g, preferably 200 m²/g to 500 m²/g, more preferably 300 m²/g to 500 m²/g.

The linear conductive material may have a BET specific surface area of 150 m²/g to 310 m²/g, preferably 150 m²/g to 280 m²/g, more preferably 200 m²/g to 280 m²/g.

The dotted conductive material may have a true density of 1.0 g/cm³ to 5.0 g/cm³, 1.5 g/cm³ to 2.5 g/cm³, 1.8 g/cm³ to 2.5 g/cm³, or 1.8 g/cm³ to 2.3 g/cm³.

The linear conductive material may have a true density of 1.0 g/cm³ to 3.0 g/cm³, 1.8 g/cm³ to 3.0 g/cm³, 1.8 g/cm³ to 2.8 g/cm³, or 1.8 g/cm³ to 2.5 g/cm³.

The lithium nickel-based oxide may be represented by Formula 1 below:

$$Li_{1+x}[Ni_aCo_bMn_cM^1_d]O_2 \qquad \text{[Formula 1]}$$

wherein, the $M^1$ includes one or more elements selected from the group consisting of W, Cu, Fe, V, Cr, Ti, Zr, Zn, Al, In, Ta, Y, In, La, Sr, Ga, Sc, Gd, Sm, Ba, Ca, Ce, Nb, Mg, B, and Mo, and $-0.10 \leq x \leq 0.10$, $0.50 \leq a < 0.70$, $0 < b < 0.5$, $0 < c < 0.5$, and $0 \leq d \leq 0.2$.

The lithium nickel-based oxide containing 70 mol % or less of nickel among all metals excluding lithium may represent 50 wt % or greater, preferably 70 wt % or greater, and more preferably 90 wt % to 100 wt % of the total weight of the positive electrode active material.

The positive electrode active material may consist of a lithium nickel-based oxide containing 70 mol % or less of nickel among all metals excluding lithium.

The lithium nickel-based oxide may include 30 or fewer nodules, wherein the average particle diameter of the nodules may be from 0.8 μm to 4.0 μm.

The lithium nickel-based oxide may further include a coating layer on the surface thereof, wherein the coating layer includes one or more elements selected from the group consisting of Ti, Mg, Al, Zr, Y, Ba, Ca, Sr, W, Ta, Nb, and Mo.

The content of the positive electrode conductive material may be from 0.5 wt % to 2 wt %, preferably 0.8 wt % to 2 wt %, more preferably 0.8 wt % to 1.8 wt %, and the content of the positive electrode active material may be 93 wt % to 99 wt %, preferably 95 wt % to 98 wt %, more preferably 95 wt % to 97 wt % based on the total weight of the positive electrode active material, the positive electrode conductive material, and the positive electrode binder.

According to another aspect of the present disclosure, there is provided a lithium secondary battery including the above-described positive electrode.

The lithium secondary battery may have a charge cut-off voltage of 4.35 V or higher, preferably 4.35V to 5V, more preferably 4.35V to 5V.

The lithium secondary battery may have a nominal voltage of 3.68 V or higher.

Advantageous Effects

A positive electrode according to the present disclosure includes, as a positive electrode active material, a lithium nickel-based oxide having a nickel content of 70 mol % or less and including single particle-type particles, and uses, as a positive electrode conductive material, a mixture of a dotted conductive material and a linear conductive material, wherein the true density of the dotted conductive material, the true density of the linear conductive material, and the average particle diameter of the positive electrode active material are controlled to satisfy specific conditions (e.g., $F_{CR}$).

As in the present disclosure, in the positive electrode, if $F_{CR}$ defined by Equation (1) satisfies 12 to 20, the conductive material is uniformly distributed in the positive electrode without agglomeration, so that an effect of improving initial resistance properties may be achieved, and a problem in which an electrode is locally deteriorated, thereby causing lithium plating may be prevented. In addition, if a positive electrode is designed such that the $F_{CR}$ is 12 to 20, even if the solid content in a positive electrode slurry is high due to low agglomeration of the positive electrode slurry, an increase in viscosity of the positive electrode slurry is small, resulting in excellent coating properties and productivity.

In addition, the positive electrode according to the present disclosure uses, as a positive electrode active material, a positive electrode active material having a nickel content of 70 mol % or less, preferably 50 mol % to 70 mol %, and including single particle-type particles, and thus, may be stably driven at a high voltage of 4.25 V or higher, thereby implementing a high capacity, and is excellent in high-temperature durability and lifespan properties.

BRIEF DESCRIPTION OF THE DRAWINGS

FIG. 1 is a graph showing the shear viscosity according to the shear rate of a positive electrode slurry prepared in each of Example 1 and Comparative Example 1.

FIG. 2 is a scanning electron microscope photograph of positive electrode active material in the form of a single-particle.

FIG. 3 is a scanning electron microscope photograph of positive electrode active material in the form of a quasi-single particle.

FIG. 4 is a scanning electron microscope photograph of positive electrode active material in the form of a secondary particle.

DETAILED DESCRIPTION OF THE PREFERRED EMBODIMENT

Hereinafter, the present disclosure will be described in more detail.

It will be understood that terms or words used in the present specification and claims shall not be construed as being limited to having meanings defined in commonly used dictionaries, but should be interpreted as having meanings and concepts consistent with the technical idea of the present disclosure based on the principle that an inventor may appropriately define concepts of the terms to best explain the present disclosure.

The terms used herein are only used to describe exemplary embodiments, and are not intended to limit the present disclosure. The terms of a singular form may include plural forms unless the context clearly indicates otherwise.

In the present specification, it should be understood that the terms, "include," "comprise," or "have" are intended to specify the presence of stated features, numbers, steps, elements, or combinations thereof, but do not preclude the presence or addition of one or more other features, numbers, steps, elements, or combinations thereof.

In the present disclosure, a "single particle-type particle" refers to a particle composed of 50 or fewer nodules, and is a concept including a single particle and a quasi-single particle. The "single particle" refers to a particle composed of one single nodule, and the "quasi-single particle" refers to a particle, which is a composite formed of 2 to 50 nodules. FIG. 2 shows a scanning electron microscope photo of a positive electrode active material in the form of a single particle, and FIG. 3 shows a scanning electron microscope photo of a positive electrode active material in the form of a quasi-single particle.

In the present disclosure, a "nodule" refers to a sub-particle unit constituting a single particle and a quasi-single particle, wherein the nodule may be a single crystal with no crystalline grain boundaries, or may be a polycrystal with no grain boundaries in appearance when observed in a range of vision of 5,000 to 20,000 times using a scanning electron microscope (SEM).

In the present disclosure, a "secondary particle" refers to a particle formed by the agglomeration of a plurality of, for example, tens to hundreds of primary particles. More specifically, the secondary particle is an agglomerate of more than 50 primary particles. FIG. 4 shows a scanning electron micrograph (SEM) of a positive electrode active material in the form of secondary particles.

The term "particle" used in the present disclosure may include any one or all of a single particle, a quasi-single particle, a primary particle, a nodule, and a secondary particle.

In the present disclosure, the "average particle diameter $D_{50}$" refers to a particle size based on 50% of a volume cumulative particle size distribution of positive electrode active material powder, and may be measured using a laser diffraction method. For example, the $D_{50}$ may be measured by dispersing positive electrode active material powder in a dispersion medium, and then introducing the mixture into a commercially available laser diffraction particle size measurement device (e.g., Microtrac MT 3000) to be irradiated with an ultrasonic wave of about 28 kHz to an output of 60 W, thereby obtaining a volume cumulative particle size distribution graph, and then obtaining a particle size corresponding to 50% of a volume cumulative amount.

In the present disclosure, the "BET specific surface area" is measured by a BET method, and specifically, may be calculated from the adsorption amount of nitrogen gas under a liquid nitrogen temperature (77K) using Belsorp-mino II of BEL Japan Co.

In the present disclosure, the "true density" may be measured using a gas pycnometer. A gas pycnometer is a device that can measure the density of a sample by placing a measurement sample the weight of which is known into a sample chamber, and then injecting a helium or nitrogen gas thereinto to find out the volume occupied by the sample, excluding pores. Specifically, after the volume of the sample is measured from a change in pressure between the sample chamber into which the sample is placed and a reference chamber the volume of which is known, and the ideal gas equation (PV=nRT) is applied to calculate the density value of the sample.

In the present disclosure, the term "linear conductive material" refers to a conductive material which is for example a fiber-type conductive material which forms a line when in contact with a positive electrode active material.

In the present disclosure, the term "dotted conductive material" refers to a conductive material for example, a spherical particle-type conductive material which forms dots when in contact with the positive electrode active material.

Hereinafter, the present disclosure will be described in detail.

Positive Electrode

In general, in order to implement a battery having a high capacity and a high energy density, a method for increasing the content of a positive electrode active material in a positive electrode active material layer may be considered. In order to increase the content of the positive electrode active material, the proportion of a binder, a conductive material, or an additive should be lowered, and therefore, a typical dotted conductive material is replaced with a linear conductive material to lower the content of the conductive material. The linear conductive material c1 has a relatively large BET specific surface area compared to the dotted conductive material c2, and thus, is capable of covering more of the surface of a positive electrode active material, so that it is possible to form a sufficient conductive network with a small content of the linear conductive material. However, the linear conductive material c1 may agglomerate, thereby causing agglomeration, and as a result, the conductive material may be unevenly distributed in the positive electrode active material layer, the initial resistance of the battery may increase, and the electrode may be locally deteriorated, thereby causing lithium precipitation, which may cause problems in resistance properties, capacity properties, gas generation amount, etc.

As a result of continuously conducting research to develop a positive electrode and a lithium secondary battery including the positive electrode with high energy density and with minimized degradation in cell performance due to the agglomeration of a conductive material, the present inventors have completed the present disclosure after finding out that if a positive electrode active material having a nickel content of 70 mol % or less and including single particle-type particles is used as a positive electrode active material, and a mixture of a dotted conductive material c2 and a linear conductive material c1 is used as a positive electrode conductive material, wherein the true density of the dotted conductive material c2, the true density of the linear conductive material c1, and the average particle diameter $D_{50.a}$ of the positive electrode active material satisfy specific conditions, it is possible to implement a high energy density due to stable driving at a high voltage of 4.35 V or higher, achieve excellent high-temperature durability, and suppress degradation in cell performance caused by the agglomeration of a conductive material.

Specifically, a positive electrode according to the present disclosure includes a positive electrode active material, a positive electrode conductive material, and a positive electrode binder, wherein the positive electrode active material includes a lithium nickel-based oxide containing 70 mol % or less of nickel among metals excluding lithium, wherein the lithium nickel-based oxide includes single particle-type particles, and the conductive material includes a linear conductive material c1 and a dotted conductive material c2, and $F_{CR}$ defined by Equation (1) below satisfies 12 to 20

$$F_{CR} = d_{c1} \times d_{c2} \times D_{50,a} \qquad \text{[Equation 1]}$$

In Equation (1) above, $d_{c1}$ [g/cm³] is the true density of the linear conductive material c1, $d_{c2}$ [g/cm³] is the true density (unit: g/cm³) of the dotted conductive material c2, and $D_{50,a}$[μm] is the average particle diameter ($D_{50}$) of the positive electrode active material.

If the $F_{CR}$ satisfies the range of the present disclosure, a lithium secondary battery presents improved initial resistance properties, improved lifespan properties due to the reduced degree of deterioration of the battery, and excellent high-temperature durability. More specifically, if the $F_{CR}$ is less than 12, there may be a problem in that the electron conductivity of a positive electrode is insufficient, thereby degrading the rate properties of a cell, and increasing the resistance thereof, and if the $F_{CR}$ is greater than 20, there may be a problem in that the resistance of a cell increases, thereby degrading the output performance, or the weight of a cell increases, thereby decreasing the energy density, and the dispersibility of a slurry is degraded, thereby degrading the quality of the electrode.

Specifically, the $F_{CR}$ may be 12 or greater, 12.5 or greater, 13 or greater, 13.5 or greater, 14 or greater, 14.5 or greater, or 15 or greater, and 20 or less, 19.5 or less, 19 or less, 18.5 or less, 18 or less, 17.5 or less, 17 or less, 16.5 or less, 16 or less, 15.5 or less, or 15 or less. For example, the $F_{CR}$ may be 12 to 20, preferably 13 to 18, and more preferably 13.5 to 17.5, even more preferably 14 to 17.

Hereinafter, each component of a positive electrode according to the present disclosure will be described in more detail.

The positive electrode according to the present disclosure includes a positive electrode active material, a positive electrode conductive material, and a positive electrode binder. Specifically, the positive electrode includes a positive electrode current collector, and a positive electrode active material layer formed on at least one surface of the positive electrode current collector, wherein the positive electrode active material layer includes the positive electrode active material, the positive electrode conductive material, and the positive electrode binder.

The positive electrode current collector is not particularly limited as long as it has electron conductivity without causing a chemical change in a battery, and for example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

The positive electrode active material layer may be positioned on the positive electrode current collector, and specifically, may be positioned on one surface or both surfaces of the positive electrode current collector. The positive electrode active material layer may have a single-layered structure or a multi-layered structure of two or more layers.

In the present disclosure, the positive electrode active material may include a lithium nickel-based oxide containing 70 mol % or less, preferably 50 mol % to 70 mol %, and more preferably 55 mol % to 65 mol % of nickel among metals excluding lithium. If a single particle-type lithium nickel-based oxide having a relatively low nickel content is used as a positive electrode active material as described above, side reactions with an electrolyte solution are suppressed under high temperature and high voltage conditions, resulting in reduced gas generation, so that it is possible to implement excellent lifespan properties.

Meanwhile, the lithium nickel-based oxide includes single particle-type particles.

In the case of a lithium nickel-based oxide in the form of a secondary particle in which fifty to hundreds of primary particles are agglomerated, side reactions with an electrolyte solution occur a lot due to a large contact area with the electrolyte solution, and a gas is generated during the side reaction process. Particularly, the amount of gas generated further increases under high temperature and/or high voltage conditions, and as a result, cell deterioration rapidly proceeds. In comparison, a lithium nickel-based oxide of single particle-type particles has a small number of nodules constituting the particle, and therefore has a small interface between the particles, resulting in a small contact area with an electrolyte solution, so that side reactions with the electrolyte solution occur less than those of a secondary particle, and accordingly, the amount of gas generation is significantly small. Therefore, if the lithium nickel-based oxide of single particle-type particles is applied as a positive electrode active material, excellent lifespan properties may be obtained even under high voltage and high temperature conditions.

In addition, in the case of a lithium nickel-based oxide including single particle-type particles and having a relatively low nickel content, the structural stability at a high voltage is higher than that of a lithium nickel-based oxide having a high nickel content or in the form of a secondary particle, so that the degradation in lifespan properties during high-voltage driving may be minimized. Specifically, as the nickel content in a lithium nickel-based oxide increases, $Ni^{+4}$ ions having high reactivity increases, and as a result, the structural stability of a positive electrode active material is reduced during charging and discharging, so that a positive electrode is rapidly deteriorated. The above phenomenon is further exacerbated during high-voltage driving. Therefore, in the present disclosure, a lithium nickel-based oxide containing 70 mol % or less of nickel among metals excluding lithium is applied to suppress the degradation in lifespan due to active material deterioration during high-voltage driving. However, if the Ni content is too small, capacity properties are degraded, so that it is preferable that the lithium nickel-based oxide contains 50 mol % to 70 mol % of nickel among metals excluding lithium.

Specifically, the lithium nickel-based oxide may be a lithium transition metal oxide including nickel, manganese, and cobalt, and may be, for example, represented by Formula 1 below.

$$Li_{1+x}[Ni_aCo_bMn_cM^1_d]O_2 \qquad \text{[Formula 1]}$$

In Formula 1 above, the $M^1$ may include one or more elements selected from the group consisting of W, Cu, Fe, V, Cr, Ti, Zr, Zn, Al, In, Ta, Y, In, La, Sr, Ga, Sc, Gd, Sm, Ba, Ca, Ce, Nb, Mg, B, and Mo. If the $M^1$ element is included, the structural stability of lithium nickel-based oxide particles is improved, so that better lifespan properties may be implemented during high-voltage driving. Preferably, the $M^1$ element may include one or more selected from the group consisting of Ti, Mg, Al, Zr, Y, Ba, Ca, Sr, W, Ta, Nb, and Mo, preferably Ti, Mg, Al, Zr, and Y, and more preferably, may include two or more selected from the group consisting of Ti, Mg, Al, Zr, Y, Ba, Ca, Sr, W, Ta, Nb, and Mo, preferably Ti, Mg, Al, Zr and Y.

The 1+x represents the lithium molar ratio in the lithium nickel-based oxide, wherein it may be that $-0.1 \leq x \leq 0.1$, $0 \leq x \leq 0.1$, or $0 \leq x \leq 0.07$. If 1+x satisfies the above-described range, a stable layered crystal structure may be formed.

The a represents the molar ratio of nickel in all metals except lithium in the lithium nickel-based oxide, wherein it may be that $0.5 \leq a \leq 0.7$, $0.55 \leq a \leq 0.7$, or $0.55 \leq a \leq 0.65$. If the a satisfies the above-described range, stable driving may be achieved at a high voltage, thereby implementing a high capacity.

The b represents the molar ratio of cobalt in all metals except lithium in the lithium nickel-based oxide, wherein it may be that $0 < b < 0.5$, $0.05 \leq b \leq 0.4$, or $0.1 \leq b \leq 0.4$.

The c represents the molar ratio of manganese in all metals except lithium in the lithium nickel-based oxide, wherein it may be that $0 < c < 0.5$, $0.05 \leq c \leq 0.4$, or $0.1 \leq c \leq 0.4$.

The d represents the molar ratio of the $M^1$ element in all metals except lithium in the lithium nickel-based oxide, wherein it may be that $0 \leq d \leq 0.2$, $0 \leq d \leq 0.1$, or $0 < d \leq 0.1$. If the molar ratio of the $M^1$ element satisfies the above-described range, both the structural stability and the capacity of the positive electrode active material may be excellent.

Meanwhile, the lithium nickel-based oxide may further include a coating layer on the surface thereof, wherein the coating layer includes one or more elements selected from the group consisting of Ti, Mg, Al, Zr, Y, Ba, Ca, Sr, W, Ta, Nb, and Mo.

If there is a coating layer present on the surface of the lithium nickel-based oxide, the contact between an electrolyte and the lithium nickel-based oxide is suppressed by the coating layer, and as a result, there may be an effect of reducing transition metal elution or gas generation due to a side reaction with the electrolyte, and accordingly, lifespan properties may be further improved. Preferably, the coating layer may include two or more elements selected from the group consisting of Ti, Mg, Al, Zr, Y, Ba, Ca, Sr, W, Ta, Nb, and Mo, and more preferably, may include two or more elements selected from the group consisting of Ti, Mg, Al, Zr, Y, and W.

Meanwhile, it is preferable that the lithium nickel-based oxide includes 50 or fewer, preferably 1 to 30, and more preferably 1 to 25 nodules. This is because if the number of nodules constituting the lithium nickel-based oxide is greater than 50, particle breakage increases during electrode manufacturing, and internal cracking increases due to volume expansion/contraction of nodules during charging and discharging, so that an effect of improving high-temperature lifespan properties and high-temperature storage properties may be degraded.

Meanwhile, the nodules may have an average particle diameter of 0.8 μm to 4.0 μm, preferably 0.8 μm to 3 μm, and more preferably 1.0 μm to 3.0 μm. If the average particle diameter of the nodules satisfies the above-described range, particle breakage is minimized during electrode manufacturing, and resistance increase may be more effectively suppressed. At this time, the average particle diameter of the nodules refers to a value obtained by measuring the particle diameter of each nodule observed in an SEM image obtained by analyzing positive electrode active material powder with a scanning electron microscope, and then calculating an arithmetic mean value of the measured values.

Meanwhile, the lithium nickel-based oxide containing 70 mol % or less of nickel among all metals excluding lithium may represent greater than 50 wt %, preferably 70 wt % or greater, more preferably 80 wt % or greater, and even more preferably 100 wt %, of the total weight of the positive electrode active material layer. If the ratio of the lithium nickel-based oxide containing 70 mol % or less of nickel among all metals excluding lithium based on the total weight of the positive electrode active material satisfies the above-described range, the battery may be stably driven at a high voltage.

The positive electrode active material layer may include, as the positive electrode active material, a positive electrode active material other than the single particle-type particles lithium nickel-based oxide containing 70 mol % or less of nickel among all metals excluding lithium, that is, a lithium nickel-based oxide in the form of a secondary particle and/or a lithium nickel-based oxide containing greater than 70 mol % of nickel among all metals excluding lithium, but if the ratio of the secondary particle and/or the lithium nickel-based oxide containing greater than 70 mol % of nickel among all metals excluding lithium is 50 wt % or greater in the total positive electrode active material, the lifespan properties of the battery may be degraded during high-voltage driving.

Meanwhile, the positive electrode active material may have an average particle diameter $D_{50.a}$ of 3.0 μm to 8.0 μm, preferably 3.0 μm to 7.5 μm. More preferably, it is preferable that the $D_{50.a}$ is about 3.5 μm to about 7.5 μm. If the average particle diameter $D_{50.a}$ of the lithium nickel-based oxide is too small, processability is reduced during electrode manufacturing, and electrolyte solution wettability is reduced, thereby increasing electrochemical properties, and if the $D_{50.a}$ is too large, there is a problem in that resistance increases and output properties are degraded. Therefore, if the average particle diameter $D_{50.a}$ of the positive electrode active material satisfies the above-described range, the electrolyte solution wettability is excellent, and both the resistance properties and the output properties are excellent.

Meanwhile, the positive electrode active material may be included in an amount of 93 wt % to 99 wt %, preferably 95 wt % to 98 wt %, and more preferably 95 wt % to 97 wt % based on the total weight of the positive electrode active material layer, that is, the total amount of the positive electrode active material, the positive electrode conductive material, and the positive binder. If the content of the positive electrode active material satisfies the above-described range, high energy density may be implemented.

Next, the positive electrode conductive material is used to impart electron conductivity to the positive electrode, and includes a linear conductive material and a dotted conductive material. If a linear conductive material and a dotted conductive material are used together as the positive electrode conductive material, excellent positive electrode conductivity may be implemented even with a relatively small amount of a conductive material, so that the content of a positive electrode active material in the positive electrode may be increased.

Examples of the linear conductive material may include, for example, fibrous carbon materials such as carbon fibers and carbon nanotubes, metal fibers made of copper, nickel, aluminum, silver, etc., and the like, but are not limited thereto, and various conductive materials in the form of fibers may be used.

Examples of the dotted conductive material may include, for example, carbon-based particles made of carbon black, acetylene black, Ketjen black, channel black, furnace black, lamp black, summer black, porous carbon, etc., but are not limited thereto.

Meanwhile, the $F_{CR}$ may be controlled within a desired range by controlling the true density of the linear conductive material and the true density of the dotted conductive material. The true density of the linear conductive material may play a role in controlling the conductivity by increasing the roll-pressing density, and the true density of the dotted conductive material may play a role in controlling the electrolyte solution wettability by increasing the porosity.

The linear conductive material may have a true density $d_{c1}$ of 1.0 g/cm$^3$ to 5.0 g/cm$^3$, preferably 1.8 g/cm$^3$ to 3.0 g/cm$^3$, more preferably 1.8 g/cm$^3$ to 2.8 g/cm$^3$, and even more preferably 1.8 g/cm$^3$ to 2.5 g/cm$^3$. If the true density of the linear conductive material satisfies the above-described range, it is possible to control the $F_{CR}$ value within a desired range, control the electron conductivity by increasing a roll-pressing density, and minimize cell performance degradation caused by conductive material agglomeration.

In addition, the dotted conductive material may have a true density $d_{c2}$ of 0.5 g/cm$^3$ to 3.0 g/cm$^3$, preferably 1.5 g/cm$^3$ to 2.5 g/cm$^3$, more preferably 1.8 g/cm$^3$ to 2.5 g/cm$^3$, and even more preferably 1.8 g/cm$^3$ to 2.3 g/cm$^3$. If the true density of the dotted conductive material and the true density of the linear conductive material satisfy the above-described ranges, it is possible to control the $F_{CR}$ value within a desired range, have excellent electrolyte solution wettability by securing the porosity at a desired level, and minimize cell performance degradation caused by conductive material agglomeration.

Meanwhile, the positive electrode conductive material may include the linear conductive material and the dotted conductive material at a weight ratio of 1:1 to 10:1, preferably 1:1 to 8:1, and more preferably 1:1 to 7:1. If the mixing ratio of the linear conductive material and the dotted conductive material satisfies the above-described range, excellent conductivity may be implemented while minimizing conductive material agglomeration, and the effect of improving initial resistance properties and high-temperature lifespan properties is more excellent.

Typically, the positive electrode conductive material may be included in an amount of 0.5 wt % to 2 wt %, preferably 0.5 wt % to 1.8 wt %, and more preferably 0.8 wt % to 1.8 wt % based on the total weight of the positive electrode active material layer, that is, the total amount of the positive electrode active material, the positive electrode conductive material, and the positive electrode binder. If the content of the positive electrode conductive material satisfies the above-described range, the positive electrode conductivity is excellent, and a high capacity may be implemented by increasing the relative content of the active material in the positive electrode.

According to an embodiment of the present disclosure, the BET of the dotted conductive material and the linear conductive material may be controlled.

The BET of the dotted conductive material and the linear conductive material may be such that $F'_{CR}$ defined by Equation (2) satisfies $1 \times 10^6$ to $2.5 \times 10^7$ $$F'_{CR} = BETc_1 \times dc_1 \times BETc_2 \times dc_2 \times (D_{50,a})^2 \qquad \text{Equation (2)}$$

wherein $BETc_1$ is the BET specific surface area(unit: m$^2$/g) of the linear conductive material C1, $BETc_2$ is the BET specific surface area(unit: m$^2$/g) of the dotted conductive material C2, $d_{c1}$, $d_{c2}$ and $D_{50,a}$ being as defined in relation with equation 1.

According to an embodiment, the dotted conductive material may have a BET specific surface area of 100 m$^2$/g to 500 m$^2$/g, preferably 200 m$^2$/g to 500 m$^2$/g, and more preferably 300 m$^2$/g to 500 m$^2$/g, and the linear conductive material may have a BET specific surface area of 150 m$^2$/g to 310 m$^2$/g, preferably 150 m$^2$/g to 280 m$^2$/g, and more preferably 200 m$^2$/g to 280 m$^2$/g. If the BET specific surface area of the dotted conductive material and the BET specific surface area of the linear conductive material satisfy the above-described ranges, it is possible to control the $F'_{CR}$ value within the desired range and minimize cell performance degradation caused by conductive material agglomeration.

It is preferable that the BET specific surface area of the dotted conductive material is larger than the BET specific surface area of the linear conductive material. If the BET specific surface area of the dotted conductive material is larger than the BET specific surface area of the linear conductive material, the agglomeration of the linear conductive material is minimized, so that the effect of improving the initial resistance and lifespan properties are excellent.

Next, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM) rubber, a sulfonated-EPDM, styrene butadiene rubber (SBR), fluorine rubber, or various copolymers thereof, and any one thereof or a mixture of two or more thereof may be used.

The positive electrode binder may be included in an amount of 0.5 wt % to 5 wt %, preferably 1 wt % to 4 wt %, and more preferably 1 wt % to 3 wt % based on the total weight of the positive electrode active material layer.

The positive electrode may be manufactured according to a typical method for manufacturing a positive electrode. For example, the positive electrode may be manufactured by preparing a positive electrode slurry by mixing a positive electrode active material, a positive electrode binder and/or a positive electrode conductive material in a solvent, and applying, followed by drying and roll-pressing, the positive electrode slurry on a positive electrode current collector, or by casting the positive electrode slurry on a separate support, and then laminating, on a positive electrode current collector, a film peeled off the support.

An aspect of the present disclosure is the positive electrode slurry useful for preparing the positive electrode as described above. Such slurry comprises all the components of the positive electrode and a solvent.

Meanwhile, as the solvent of the positive electrode slurry, solvents commonly used in the art may be used, and for example, dimethyl sulfoxide (DMSO), isopropyl alcohol, N-methylpyrrolidone (NMP), acetone, water, and the like may be used alone, or two or more thereof may be mixed and used. The solvent may be used in an amount sufficient to dissolve or disperse the positive electrode active material, the positive electrode conductive material, and the positive electrode binder in consideration of the application thickness and preparation yield of the slurry, and thereafter, to allow the slurry to have a viscosity which may exhibit excellent thickness uniformity when applied for the manufacturing of the positive electrode.

Even though the positive electrode slurry of the present disclosure including both the linear conductive material and the dotted conductive material presents a shear viscosity which is low enough to minimize mixing energy and allows an easy and regular coating. In addition, due to the regular distribution of the conductive material in a positive electrode active material layer the local deterioration is avoided, thereby avoiding the problems that cell capacity decreases and resistance increases.

Lithium Secondary Battery

According to another aspect of the present disclosure, a lithium secondary battery according to the present disclosure includes the above-described positive electrode. Specifically, the lithium secondary battery may include a positive electrode, a negative electrode, a separator, and an electrolyte, and more specifically, the lithium secondary battery may include an electrode assembly including a positive electrode, a negative electrode, and a separator, an electrolyte, and a battery case in which the electrode assembly and the electrolyte are accommodated. In another aspect, a separator may not be included depending on the battery type. For example, the lithium secondary battery may include a positive electrode, a negative electrode positioned to face the positive electrode, and a solid electrolyte interposed between the positive electrode and the negative electrode.

Meanwhile, it is preferable that the lithium secondary battery has a charge cut-off voltage of 4.35 V or higher, preferably 4.35 V to 5 V, and more preferably 4.35 V to 4.5 V. If the charge cut-off voltage satisfies the above-described range, excellent capacity properties may be implemented. The capacity of the positive electrode active material is affected not only by the composition of an active material used, but also by the range of a driving voltage. For example, even a lithium nickel cobalt manganese-based oxide having the same transition metal composition has a problem in that if a charge cut-off voltage becomes higher, side reactions with an electrolyte solution occur more during charging and discharging, and the structural collapse of a positive electrode active material rapidly occurs, so that lifespan properties are rapidly deteriorated. The problem as described above is more prominent in a high-nickel-based lithium nickel-cobalt-manganese-based oxide with a high nickel content. Therefore, typically, when a lithium nickel-cobalt-manganese-based oxide is used as a positive electrode active material, a driving voltage of about 2.0 V to about 4.3 V has been commonly used. However, in the present disclosure, by applying, as a positive electrode active material, a lithium nickel-based oxide having a Ni content of 70 mol % or less and including single particle-type particles, it is possible to maintain excellent lifespan properties even when driven at a high voltage with a charge cut-off voltage of 4.35 V or higher.

Meanwhile, the lithium secondary battery may have a nominal voltage of 3.68 V or higher, preferably 3.68 V to 3.80 V, and more preferably 3.69 V to 3.75 V. The nominal voltage refers to a voltage average value when the lithium secondary battery is discharged. Since the energy density of the lithium secondary battery is calculated as the product of the average voltage and the average current during discharge, the energy density increases if the nominal voltage is high. The nominal voltage of a lithium secondary battery to which a typical lithium nickel cobalt manganese-based oxide is applied as a positive electrode active material is about 3.6 V, but in the present disclosure, a charge cut-off voltage is increased to allow a nominal voltage to be 3.68 V or higher, thereby implementing a high energy density. Specifically, a lithium secondary battery according to the present disclosure may have an energy density of 500 Wh/L or greater, 550 Wh/L or greater, or 500 Wh/L to 800 Wh/L.

Hereinafter, each component constituting the lithium secondary battery will be described in detail.

(1) Electrode Assembly

The electrode assembly includes a positive electrode, a negative electrode, and a separator.

Specifically, the electrode assembly may be formed by sequentially stacking a positive electrode, a separator, and a negative electrode, and the positive electrode and the negative electrode may be mutually insulated by the separator.

Types of the electrode assembly may include a stack type, a jelly-roll type, a stack and fold type, and the like, but are not limited thereto.

Hereinafter, each component of the electrode assembly according to the present disclosure will be described in detail.

1) Positive Electrode

The positive electrode is the same as described above, and thus, a detailed description thereof will be omitted.

2) Negative Electrode

The negative electrode may include a negative electrode active material, a negative electrode conductive material, and a negative electrode binder.

Specifically, the negative electrode includes a negative electrode current collector, and a negative electrode active material layer formed on at least one surface of the negative electrode current collector, wherein the negative electrode active material layer includes the negative electrode active material, the negative electrode conductive material, and the negative electrode binder.

The negative electrode current collector is not particularly limited as long as it has electron conductivity without causing a chemical change in a battery, and for example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of the negative electrode active material. For example, the negative electrode current collector may be used in various forms such as a film, a sheet, a foil, a net, a porous body, a foam, a non-woven body, and the like.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used.

Meanwhile, as the carbonaceous material, both low crystalline carbon and high crystalline carbon may be used. Representative examples of the low crystalline carbon may include soft carbon and hard carbon, and representative examples of the high crystalline carbon may include irregular, planar, flaky, spherical, or fibrous natural graphite or artificial graphite, Kish graphite, liquid crystal a pitch, mesophase pitch-based carbon fiber, meso-carbon microbeads, mesophase pitches, and high-temperature sintered carbon such as petroleum or coal tar pitch derived cokes.

Preferably, the negative electrode active material may be composed of a carbon-based negative electrode active material, and at this time, the carbon-based negative electrode active material may include, for example, natural graphite, artificial graphite, graphitized carbon fiber, amorphous carbon, soft carbon, hard carbon, or a combination thereof. More preferably, the carbon-based negative electrode active material may include natural graphite and artificial graphite.

The carbon-based negative electrode active material may have an average particle diameter $D_{50}$ of 2 μm to 30 μm, preferably 5 μm to 30 μm.

The negative electrode active material may be included in an amount of 80 wt % to 98 wt %, preferably 90 wt % to 98 wt %, and more preferably 93 wt % to 98 wt % based on the total weight of the negative electrode active material layer. When the content of the negative electrode active material satisfies the above-described ranges, excellent energy density may be implemented.

Next, the negative electrode conductive material is used to impart conductivity to a negative electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, carbon fiber, and a carbon nanotube; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used.

Typically, the negative electrode conductive material may be included in an amount of 0.1 wt % to 10 wt %, preferably 0.5 wt % to 8 wt %, and more preferably 1 wt % to 5 wt % based on the total weight of the negative electrode active material layer.

The negative electrode binder serves to improve the bonding between negative electrode active material particles and the adhesion between the negative electrode active material and the negative electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The negative electrode binder may be included in an amount of 1 wt % to 10 wt %, preferably 1 wt % to 8 wt %, and more preferably 1 wt % to 5 wt % based on the total weight of the negative electrode active material layer.

Meanwhile, in the present disclosure, the negative electrode active material layer may have a single-layered structure, or may have a multi-layered structure of two or more layers. For example, the negative electrode may include a first negative electrode active material layer formed on the negative electrode current collector, and including a first negative electrode active material, and a second negative electrode active material layer formed on the first negative electrode active material layer, and including a second negative electrode active material. According to an embodiment, the first negative electrode active material and the second negative electrode active material may each be composed of a carbon-based negative electrode active material, and may each be, for example, natural graphite, artificial graphite, or a combination thereof.

Meanwhile, when the negative electrode active material layer has the multi-layered structure composed of two or more layers, each layer may have different types and/or contents of a negative electrode active material, a binder, and/or a conductive material.

For example, the weight ratio of natural graphite to the total weight of the negative electrode active material in the first negative electrode active material layer (lower layer) may be formed to be higher than the weight ratio of natural graphite to the total weight of the negative electrode active material in the second negative electrode active material layer (upper layer), and the weight ratio of artificial graphite to the total weight of the negative electrode active material in the second negative electrode active material layer may be formed to be higher than the weight ratio of the artificial graphite to the total weight of the negative active material in the first negative electrode active material layer.

Alternatively, the weight ratio of the conductive material to the total weight of the second negative electrode active material layer (the upper layer) may be formed to be higher than the weight ratio of the conductive material to the total weight of the first negative electrode active material layer (the lower layer).

By forming the negative electrode active material layer in a multi-layered structure as described above, and by varying the composition of each layer, it is possible to further improve the performance properties of a battery, such as fast charge performance, output performance, and the like.

The negative electrode may be manufactured according to a typical method for manufacturing a negative electrode. For example, the negative electrode may be manufactured by preparing a negative electrode slurry by mixing a negative electrode active material, a negative electrode binder and/or a negative electrode conductive material in a solvent, and applying, followed by drying and roll-pressing, the negative electrode slurry on a negative electrode current collector, or by casting the negative electrode slurry on a separate support, and then laminating, on a negative electrode current collector, a film peeled off the support.

Meanwhile, as the solvent of the negative electrode slurry, solvents commonly used in the art may be used, and for example, dimethyl sulfoxide (DMSO), isopropyl alcohol, N-methylpyrrolidone (NMP), acetone, water, and the like may be used alone, or two or more thereof may be mixed and used. The solvent may be used in an amount sufficient to dissolve or disperse the negative electrode active material, the conductive material, and the binder in consideration of the application thickness and preparation yield of the slurry, and thereafter, to allow the slurry to have a viscosity which may exhibit excellent thickness uniformity when applied for the manufacturing of the negative electrode.

3) Separator

Next, the separator is to separate a negative electrode and a positive electrode and to provide a movement path for lithium ions, and any separator may be used without particular limitation as long as it is a separator typically used in a lithium secondary battery. At this time, the separator may be interposed between the positive electrode and the negative electrode.

Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a stacked structural body having two or more layers thereof may be used. Also, a typical porous non-woven fabric, for example, a non-woven fabric made of glass fiber having a high melting point, polyethylene terephthalate fiber, or the like may be used. Also, a coated separator including a ceramic component or a polymer material may be used to secure heat resistance or mechanical strength, and may selectively be used in a single-layered or multi-layered structure.

(2) Electrolyte

An electrolyte according to the present disclosure may include a lithium salt and an organic solvent.

Any compound may be used as the lithium salt without particular limitation as long as it is a compound capable of providing lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$(LiFSI), $LiCl$, $LiI$, $LiB(C_2O_4)_2$, or the like may be used. It is good that the lithium salt is used in a concentration range of 0.1 M to 5.0 M, preferably 0.1 M to 3.0 M. If the concentration of the lithium salt is included in the above-described range, the electrolyte has suitable conductivity and viscosity, and thus, may exhibit excellent performance, and lithium ions may effectively move.

The organic solvent may include at least one among a cyclic carbonate-based organic solvent, a linear carbonate-based organic solvent, a linear ester-based organic solvent, and a cyclic ester-based organic solvent.

The cyclic carbonate-based organic solvent is a high-viscosity organic solvent and may representatively include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate.

In addition, the linear carbonate-based organic solvent is an organic solvent having a low viscosity and a low dielectric constant, and representative examples may include at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate, and specifically, may include ethylmethyl carbonate (EMC).

Specific examples of the linear ester-based organic solvent may include at least one organic solvent selected from the group consisting of methyl acetate, ethyl acetate, propyl acetate, methyl propionate, ethyl propionate, propyl propionate, and butyl propionate.

The cyclic ester-based organic solvent may be at least one organic solvent selected from the group consisting of γ-butyrolactone, γ-valerolactone, γ-caprolactone, σ-valerolactone, and ε-caprolactone.

Preferably, the electrolyte according to the present disclosure may include, as an organic solvent, ethylene carbonate and dimethyl carbonate.

Meanwhile, for purposes of improving the lifespan properties of a battery, suppressing the reduction in battery capacity, improving the discharge capacity of the battery, and the like, the electrolyte may further include other additives in addition to the above-described components constituting the electrolyte.

Representative examples of such additives may include at least one additive selected from the group consisting of a cyclic carbonate-based compound, a halogen-substituted carbonate-based compound, a sultone-based compound, a sulfate-based compound, a borate-based compound, a nitrile-based compound, a benzene-based compound, an amine-based compound, a silane-based compound, and a lithium salt-based compound different from the lithium salt included in the electrolyte.

Specifically, the other additives may include one or two or more compounds selected from the group consisting of vinylene carbonate (VC), vinylethylene carbonate, fluoroethylene carbonate (FEC), 1,3-propane sultone (PS), 1,4-butane sultone, ethenesultone, 1,3-propene sultone (PRS), 1,4-butene sultone, 1-methyl-1,3-propene sultone, ethylene sulfate (Esa), trimethylene sulfate (TMS), methyl trimethylene sulfate (MTMS), tetraphenylborate, lithium oxalyldifluoroborate, succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, fluorobenzene, triethanolamine, ethylene diamine, tetravinylsilane, lithium bis(fluorosulfonyl)imide ($LiN(SO_2F)_2$, $LiFSI$), lithium bis(trifluoromethane sulfonyl)imide ($LiN(SO_2CF_3)_2$, $LiTFSI$), $LiPO_2F_2$, $LiODFB$, lithium bisoxalatoborate ($LiB(C_2O_4)_2$, $LiBOB$) and $LiBF_4$.

The other additives may be included in an amount of 0.1 wt % to 20 wt %, preferably 0.05 wt % to 5.0 wt %, based on the total weight of the electrolyte. If the content of the other additives is less than 0.01 wt %, the effect of improving the low-temperature output of a battery as well as the high-temperature storage properties and high-temperature lifespan properties of the same is insignificant, and if the content of the other additives is greater than 20 wt %, there is a possibility in that side reactions in the electrolyte may excessively occur during charging and discharging of the battery. Particularly, if the additives for forming an SEI film are added in excess, the additives may not be sufficiently decomposed at a high temperature, and thus, may be present as unreacted substances or in a precipitated state in the electrolyte at room temperature. Accordingly, a side reaction causing the lifespan or resistance properties of the battery to degrade may occur.

As the inorganic solid electrolyte, for example, nitrides, halides, sulfides, sulfates and the like of Li such as Li3N, LiI, Li5NI2, Li3N—LiI—LiOH, LiSiO4, LiSiO4-LiI—LiOH, Li2SiS3, Li4SiO4, Li4SiO4-LiI—LiOH or Li3PO4-Li2S—SiS2 may be used.

(3) Battery Case

The battery case is for accommodating the electrode assembly and the electrolyte, and various battery cases known in the art, for example, a cylindrical battery case, a prismatic battery case, a pouch-type battery case, and the like may be used.

The lithium secondary battery may be divided into various batteries such as a lithium-sulfur battery, a lithium-air battery, a lithium-oxide battery or a lithium all-solid-state battery, and depending on the shape, may be divided into a cylinder-type, a square-type, a coin-type, a pouch-type and the like, and depending on the size, may be divided into a bulk type and a thin film type. Structures and manufacturing methods of these batteries are widely known in the art, and therefore, detailed descriptions thereon are not included.

The lithium secondary battery according to the present disclosure may be usefully applied in portable devices such as mobile phones, laptop computers, digital cameras, and the like, and in the field of electric cars such as a hybrid electric vehicle (HEV), and the like. The lithium secondary battery according to the present disclosure is driven at a high voltage, and thus, may implement high energy density, and is excellent in safety during thermal runaway, and thus, may be particularly usefully used in the field of electric vehicles.

According to another embodiment of the present disclosure, a battery module including the lithium secondary battery according to the present disclosure as a unit cell, and a battery pack including a plurality of the battery modules are provided.

According to another embodiment of the present disclosure, a battery pack including a plurality of the lithium secondary batteries according to the present disclosure as unit cells are also provided. The battery pack may not include any battery modules.

The battery module or the battery pack may be used as a power source of one or more medium-and-large-sized devices such as a power tool, an electric car including an electric vehicle (EV), a hybrid electric vehicle (HEV), and a plug-in hybrid electric vehicle (PHEV), or a power storage system.

The present disclosure also relates to a pack cell assembly.

According to an embodiment, a battery module may comprise between 10 and 50 unit cells, preferably between 16 and 36 unit cells. A battery pack may comprise between 10 and 1,000 unit cells, preferably between 10 and 500 unit cells.

Hereinafter, embodiments of the present disclosure will be described in detail so that those skilled in the art may easily carry out the present disclosure. However, the present disclosure may be embodied in many different forms, and is not limited to the embodiments set forth herein.

EXAMPLES AND COMPARATIVE EXAMPLES

Example 1

<Manufacturing of Positive Electrode>

A positive electrode active material:a positive electrode conductive material:a PVDF binder were mixed in N-methylpyrrolidone at a weight ratio of 97:1:2 to prepare a positive electrode slurry (solid content 75 wt %). At this time, 100% of $Li[Ni_{0.60}Co_{0.10}Mn_{0.30}]O_2$ of single particle-type particles having a $D_{50}$ of 3.6 μm was used as the positive electrode active material, and carbon nanotubes (linear conductive material) having a BET specific surface area of 185 $m^2$/g and a true density of 2.018 $g/cm^3$, and acetylene black (dotted conductive material) having a BET specific surface area of 301 $m^2$/g and a true density of 1.95 $g/cm^3$ were mixed at a weight ratio of 2:1 and used as the positive electrode conductive material.

The positive electrode slurry was applied on an aluminum current collector sheet, dried, and then roll-pressed to manufacture a positive electrode.

<Manufacturing of Negative Electrode>

A negative electrode active material:a negative electrode conductive material styrene-butadiene rubber (SBR):carboxymethyl cellulose (CMC) were mixed in water at a weight ratio of 95:1.4:2.5:1.1 to prepare a negative electrode slurry. At this time, natural graphite:artificial graphite were mixed at a weight ratio of 1:4 and used as the negative electrode active material, and carbon black was used as the negative electrode conductive material.

The negative electrode slurry was applied on a copper current collector sheet, dried, and then roll-pressed to manufacture a negative electrode.

<Manufacturing of Lithium Secondary Battery>

A lithium secondary battery cell was manufactured by interposing a separator between the positive electrode and the negative electrode manufactured as described above to manufacture an electrode assembly, inserting the electrode assembly into a battery case, and then injecting an electrolyte thereto.

At this time, an electrolyte prepared by dissolving 1.0 M of $LiPF_6$ in a mixed solvent in which ethylene carbonate (EC):ethyl methyl carbonate (EMC) were mixed at a volume ratio of 3:7, and then adding, as an additive, 0.5 wt % of vinylene carbonate (VC), 0.5 wt % of propane sultone (PS), 1 wt % of ethylene sulfate (ESa), and 1 wt % of lithium difluorophosphate, and 0.2 wt % of $LiBF_4$ thereto was used as the electrolyte.

Example 2

A positive electrode, a negative electrode, and a lithium secondary battery were manufactured in the same manner as in Example 1, except that carbon nanotubes (linear conductive material) having a BET specific surface area of 185 $m^2$/g and a true density of 2.018 $g/cm^3$, and acetylene black (dotted conductive material) having a BET specific surface area of 301 $m^2$/g and a true density of 1.95 $g/cm^3$ were mixed at a weight ratio of 5:1 and used as the positive electrode conductive material.

Example 3

A positive electrode, a negative electrode, and a lithium secondary battery were manufactured in the same manner as in Example 1, except that carbon nanotubes (linear conductive material) having a BET specific surface area of 301 $m^2$/g and a true density of 2.018 $g/cm^3$, and acetylene black (dotted conductive material) having a BET specific surface area of 138 $m^2$/g and a true density of 1.95 $g/cm^3$ were mixed at a weight ratio of 2:1 and used as the positive electrode conductive material.

Example 4

A positive electrode, a negative electrode, and a lithium secondary battery were manufactured in the same manner as in Example 1, except that carbon nanotubes (linear conductive material) having a BET specific surface area of 185 $m^2$/g and a true density of 2.4/$cm^3$ was used as the linear conductive material.

Example 5

A positive electrode, a negative electrode, and a lithium secondary battery were manufactured in the same manner as in Example 1, except that 100% of $Li[Ni_{0.62}Co_{0.06}Mn_{0.32}]O_2$ of single particle-type particles having a $D_{50}$ of 4.087 μm was used as the positive electrode active material.

Example 6

A positive electrode, a negative electrode, and a lithium secondary battery were manufactured in the same manner as in Example 1, except that natural graphite:artificial graphite were mixed at a weight ratio of 1:1 and used as the negative electrode active material.

Comparative Example 1

A positive electrode, a negative electrode, and a lithium secondary battery were manufactured in the same manner as in Example 1, except that carbon nanotubes (linear conductive material) having a BET specific surface area of 185 $m^2/g$ and a true density of 2.018 $g/cm^3$ were used alone as the positive electrode conductive material, and the positive electrode slurry was prepared to have a solid content of 72 wt %.

Comparative Example 2

A positive electrode, a negative electrode, and a lithium secondary battery were manufactured in the same manner as in Example 1, except that furnace black (dotted conductive material) having a BET specific surface area of 62 $m^2/g$ and a true density of 1.95 $g/cm^3$ was used alone as the positive electrode conductive material.

Comparative Example 3

A positive electrode, a negative electrode, and a lithium secondary battery were manufactured in the same manner as in Example 1, except that carbon nanotubes (linear conductive material) having a BET specific surface area of 1200 $m^2/g$ and a true density of 1.7 $g/cm^3$, and porous carbon black (dotted conductive material) having a BET specific surface area of 1500 $m^2/g$ and a true density of 1.95 $g/cm^3$ and having micropores with a diameter of 0.1 nm to 2 nm and mesopores with a diameter of 2 nm to 50 nm which co-exited therein were mixed at a weight ratio of 2:1 and used as the positive electrode conductive material.

Comparative Example 4

A positive electrode, a negative electrode, and a lithium secondary battery were manufactured in the same manner as in Example 1, except that $Li[Ni_{0.6}Co_{0.1}Mn_{0.3}]O_2$ of single particle-type particles having a $D_{50}$ of 12 μm was used as the positive electrode active material and carbon nanotubes (linear conductive material) having a BET specific surface area of 185 $m^2/g$ and a true density of 2.018 $g/cm^3$, and acetylene black (dotted conductive material) having a BET specific surface area of 242 $m^2/g$ and a true density of 1.95 $g/cm^3$ were mixed at a weight ratio of 2:1 and used as the positive electrode conductive material.

Comparative Example 5

A positive electrode, a negative electrode, and a lithium secondary battery were manufactured in the same manner as in Example 1, except that 100% of $Li[Ni_{0.6}Co_{0.2}Mn_{0.2}]O_2$ of single particle-type particles having a $D_{50}$ of 12 μm was used as the positive electrode active material.

Comparative Example 6

A positive electrode, a negative electrode, and a lithium secondary battery were manufactured in the same manner as in Example 1, except that 100% of $Li[Ni_{0.65}Co_{0.15}Mn_{0.20}]O_2$ of single particle-type particles having a $D_{50}$ of 4.087 μm was used as the positive electrode active material, and acetylene black (dotted conductive material) having a BET specific surface area of 68 $m^2/g$ and a true density of 2.25 $g/cm^3$ was used as the dotted conductive material of the positive electrode conductive material.

Comparative Example 7

A positive electrode, a negative electrode, and a lithium secondary battery were manufactured in the same manner as in Example 1, except that 100% of $Li[Ni_{0.6}Co_{0.1}Mn_{0.3}]O_2$ of single particle-type particles having a $D_{50}$ of 2.8 μm was used as the positive electrode active material, and carbon nanotubes (linear conductive material) having a BET specific surface area of 185 $m^2/g$ and a true density of 2.018 $g/cm^3$ as the linear conductive material and furnace black (dotted conductive material) having a BET specific surface area of 62 $m^2/g$ and a true density of 1.95 $g/cm^3$ as the dotted conductive material were mixed at a weight ratio of 2:1 and used as the positive electrode conductive material.

$F_{CR}$ and $F'_{CR}$ values of the positive electrodes manufactured in Examples 1 to 6 and Comparative Examples 1 to 7 above were calculated and are shown in Table 1 below. The $F_{CR}$ values are defined according to Equation (1) below.

$$F_{CR} = d_{c1} \times d_{c2} \times D_{50.a} \qquad \text{[Equation 1]}$$

wherein, $d_{c1}$ is the true density (unit: $g/cm^3$) of the linear conductive material above, $d_{c2}$ is the true density (unit: $g/cm^3$) of the dotted conductive material above, and $D_{50.a}$ is the average particle diameter ($D_{50}$) of the positive electrode active material (unit: μm).

The $F'_{CR}$ values are defined according to Equation (2) below.

$$F'_{CR} = BETc_1 \times dc_1 \times BETc_2 \times dc_2 \times (D_{50,a})^2 \qquad \text{Equation (2)}$$

wherein in Equation (2) above, BETc1 is the BET specific surface area (unit: m2/g) of the linear conductive material, BETc2 is the BET specific surface area(unit: m2/g) of the dotted conductive material, dc1, dc2 and D50.a being as defined in relation with equation 1.

TABLE 1

| | active material | linear conductive material | | dotted conductive material | | | |
| | | | | | | | |
| | $D_{50,a}$ (μm) | $BETc_1$ ($m^2/g$) | $dc_1$ ($g/cm^3$) | $BETc_2$ ($m^2/g$) | $dc_2$ ($g/cm^3$) | $F_{CR}$ | $F'_{CR}$ |
| --- | --- | --- | --- | --- | --- | --- | --- |
| Example 1 | 3.6 | 185 | 2.018 | 301 | 1.95 | 14.17 | $2.84 \times 10^6$ |
| Example 2 | 3.6 | 185 | 2.018 | 301 | 1.95 | 14.17 | $2.84 \times 10^6$ |
| Example 3 | 3.6 | 301 | 2.018 | 138 | 1.95 | 14.17 | $2.12 \times 10^6$ |

24

TABLE 1-continued

| | active material | linear conductive material | | dotted conductive material | | | |
|---|---|---|---|---|---|---|---|
| | $D_{50,a}$ (µm) | $BETc_1$ (m²/g) | $dc_1$ (g/cm³) | $BETc_2$ (m²/g) | $dc_2$ (g/cm³) | $F_{CR}$ | $F'_{CR}$ |
| Example 4 | 3.6 | 185 | 2.4 | 138 | 1.95 | 16.85 | $1.5 \times 10^6$ |
| Example 5 | 4.087 | 185 | 2.018 | 301 | 1.95 | 16.08 | $3.6 \times 10^6$ |
| Example 6 | 3.6 | 185 | 2.018 | 301 | 1.95 | 14.17 | $2.84 \times 10^6$ |
| Comparative Example 1 | 3.6 | 185 | 2.018 | — | — | 0 | 0 |
| Comparative Example 2 | 3.6 | — | — | 62 | 1.95 | 0 | 0 |
| Comparative Example 3 | 3.6 | 1200 | 1.7 | 1500 | 1.95 | 11.93 | $7.7 \times 10^7$ |
| Comparative Example 4 | 12 | 185 | 2.018 | 242 | 1.95 | 47.22 | $2.54 \times 10^7$ |
| Comparative Example 5 | 12 | 185 | 2.018 | 301 | 1.95 | 47.22 | $3.16 \times 10^7$ |
| Comparative Example 6 | 4.087 | 185 | 2.018 | 68 | 2.25 | 34.96 | $9.54 \times 10^5$ |
| Comparative Example 7 | 2.8 | 185 | 2.018 | 62 | 1.95 | 11.02 | $3.54 \times 10^5$ |

Experimental Example 1: Evaluation of Initial Resistance

The impedance of each of the lithium secondary batteries manufactured in Examples 1 to 6 and Comparative Examples 1 to 7 was measured by electrochemical impedance spectroscopy (EIS). The measurement results are shown in Table 2.

TABLE 2

| | $R_0$ | $R_{ct}$ | $R_0 + R_{ct}$ |
|---|---|---|---|
| Example 1 | 0.14 | 0.558 | 0.689 |
| Example 2 | 0.126 | 0.579 | 0.705 |
| Example 3 | 0.132 | 0.574 | 0.706 |
| Example 4 | 0.132 | 0.570 | 0.702 |
| Example 5 | 0.14 | 0.574 | 0.714 |
| Example 6 | 0.136 | 0.562 | 0.698 |
| Comparative Example 1 | 0.141 | 0.582 | 0.723 |
| Comparative Example 2 | 0.194 | 0.577 | 0.771 |
| Comparative Example 3 | 0.139 | 0.769 | 0.908 |
| Comparative Example 4 | 0.137 | 0.883 | 1.02 |
| Comparative Example 5 | 0.137 | 0.883 | 1.02 |
| Comparative Example 6 | 0.139 | 0.703 | 0.842 |
| Comparative Example 7 | 0.135 | 0.768 | 0.903 |

Through Table 2, it can be confirmed that the secondary batteries of Examples 1 to 6 have a smaller impedance than the secondary batteries of Comparative Examples 1 to 7, and thus, have excellent initial resistance properties.

Experimental Example 2 High-Temperature Lifespan Evaluation

Two of each of the lithium secondary batteries manufactured in Examples 1 to 6 and Comparative Examples 1 to 7 were charged and discharged at 45° C. at 0.33 C in the voltage range of 2.5 V to 4.35 V, which was set to one cycle, and then 300 cycles of the charging and discharging were performed to measure the capacity retention rate and the resistance increase rate by using a cycler manufactured by PNE Co. The measurement results are shown in Table 3 below.

TABLE 3

| | Capacity retention rate (%) | Resistance increase rate (%) |
|---|---|---|
| Example 1 | 93.5 | 48.2 |
| Example 2 | 92.07 | 57.3 |
| Example 3 | 92.2 | 58.96 |
| Example 4 | 92.31 | 62.46 |
| Example 5 | 92.95 | 49.90 |
| Example 6 | 92.1 | 56.3 |
| Comparative Example 1 | 88.6 | 63.1 |
| Comparative Example 2 | 92.05 | 59.1 |
| Comparative Example 3 | 87.9 | 81.2 |
| Comparative Example 4 | 89.3 | 59.9 |
| Comparative Example 5 | 90.22 | 72.73 |
| Comparative Example 6 | 89.01 | 69.88 |
| Comparative Example 7 | 88.2 | 75.6 |

Through Table 3 above, it can be confirmed that the secondary batteries of Examples 1 to 7 are excellent in both capacity retention rate and resistance increase rate at high temperatures compared to the secondary batteries of Comparative Examples 1 to 7, and thus, have excellent high-temperature lifespan properties.

Experimental Example 3: Slurry Stability Evaluation

The shear viscosity of the positive electrode slurries prepared in Example 1 and Comparative Example 1 was measured using a Rheometer equipment of TA Instrument. The measurement results are shown in FIG. 1.

Through FIG. 1, it can be confirmed that even though the positive electrode slurry of Example 1 using both the linear conductive material and the dotted conductive material has a higher solid content, the shear viscosity thereof is lower than that of the positive electrode slurry of Comparative Example 1 using the linear conductive material alone.

What is claimed is:

1. A positive electrode comprising:

a positive electrode active material; a positive electrode conductive material; and a positive electrode binder, wherein:

the positive electrode active material includes a lithium nickel-based oxide represented by Formula 1:

$$Li_{1+x}[Ni_aCo_bMn_cM^1_d]O_2 \qquad \text{[Formula 1]}$$

wherein in Formula 1, the $M^1$ includes one or more elements selected from the group consisting of W, Cu, Fe, V, Cr, Ti, Zr, Zn, Al, In, Ta, Y, In, La, Sr, Ga, Sc, Gd, Sm, Ba, Ca, Ce, Nb, Mg, B, and Mo, and $-0.1 \leq x \leq 0.1$, $0.50 \leq a < 0.70$, $0 < b < 0.5$, $0 < c < 0.5$, and $0 \leq d \leq 0.2$;

the conductive material includes a linear conductive material (c1) and a dotted conductive material (c2);

the dotted conductive material has a BET specific surface area of 200 m²/g to 500 m²/g;

the linear conductive material has a BET specific surface area of 150 m²/g to 310 m²/g;

the BET specific surface area of the dotted conductive material is greater than the BET specific surface area of the linear conductive material; and $F_{CR}$ defined by Equation (1) below satisfies 12 to 20:

$$F_{CR} = d_{c1} \times d_{c2} \times D_{50,a} \qquad \text{[Equation (1)]}$$

wherein, $d_{c1}$ is a true density (unit: g/cm³) of the linear conductive material C1 and $d_{c1}$ is from 1.0 g/cm³ to 5.0 g/cm³, $d_{c2}$ is a true density (unit: g/cm³) of the dotted conductive material c2 and $d_{c2}$ is from 0.5 g/cm³ to 3.0 g/cm³, and $D_{50,a}$ is an average particle diameter ($D_{50}$) of the positive electrode active material (unit: μm) and $D_{50,a}$ is from 3 μm to 8 μm.

2. A positive electrode according to claim 1, wherein $F'_{CR}$ defined by Equation (2) below satisfies $1 \times 10^6$ to $2.5 \times 10^7$ $$F'_{CR} = BETc_1 \times dc_1 \times BETc_2 \times dc_2 \times (D_{50,a})^2 \qquad \text{Equation (2):}$$

wherein, $BETc_1$ is a BET specific surface area (unit: m²/g) of the linear conductive material, $BETc_2$ is a BET specific surface area (unit: m²/g) of the dotted conductive material, $d_{c1}$, $d_{c2}$ and $D_{50,a}$ being as defined in relation with the Equation (1).

3. The positive electrode according to claim 1, wherein the positive electrode conductive material comprises the linear conductive material and the dotted conductive material at a weight ratio of 1:1 to 10:1.

4. The positive electrode according to claim 1, wherein the dotted conductive material has a BET specific surface area of 300 m²/g to 500 m²/g, and wherein the linear conductive material has a BET specific surface area of 200 m²/g to 280 m²/g.

5. The positive electrode according to claim 1, wherein the lithium nickel-based oxide containing 70 mol % or less of nickel among all metals excluding lithium represents 50 wt % or greater of the total weight of the positive electrode active material.

6. The positive electrode according to claim 1, wherein the positive electrode active material consists of a lithium nickel-based oxide containing 70 mol % or less of nickel among all metals excluding lithium.

7. The positive electrode according to claim 1, wherein the lithium nickel-based oxide comprises 50 or fewer nodules, wherein the average particle diameter of the nodules is 0.8 μm to 4.0 μm.

8. The positive electrode according to claim 1, wherein the lithium nickel-based oxide further comprises a coating layer on the surface thereof, wherein the coating layer includes one or more elements selected from the group consisting of Ti, Mg, Al, Zr, Y, Ba, Ca, Sr, W, Ta, Nb, and Mo.

9. The positive electrode according to claim 1, wherein the content of the positive electrode conductive material is 0.5 wt % to 2 wt %, and the content of the positive electrode active material is 93 wt % to 99 wt % based on the total weight of the positive electrode active material, the positive electrode conductive material, and the positive electrode binder.

10. The positive electrode according to claim 1, wherein the linear conductive material comprises carbon fiber or carbon nanotubes.

11. The positive electrode according to claim 1, wherein the dotted conductive material comprises carbon black, acetylene black, Ketjen black, channel black, furnace black, lamp black, summer black, or porous carbon.

12. The positive electrode according to claim 1, wherein the linear conductive material comprises carbon fiber or carbon nanotubes and the dotted conductive material comprises acetylene black.

13. The positive electrode according to claim 1, wherein the positive electrode binder comprises polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM) rubber, a sulfonated-EPDM, styrene butadiene rubber (SBR), or fluorine rubber.

14. A lithium secondary battery comprising the positive electrode according to according to claim 1.

15. The lithium secondary battery of claim 14, wherein the lithium secondary battery has a charge cut-off voltage of 4.35 V or higher.

16. The lithium secondary battery according to claim 14, wherein the lithium secondary battery has a nominal voltage of 3.68 V or higher.

17. A battery module comprising the lithium secondary battery according to claim 14 as a unit cell.

18. The battery module according to claim 17, wherein the battery module comprises between 10 and 50 unit cells.

19. A battery pack comprising the battery module of claim 17.

20. A battery pack comprising the lithium secondary battery according to claim 14 as a unit cell.

21. The battery pack according to claim 20, wherein the battery pack comprising preferably between 10 and 1,000 unit cells.

* * * * *